2,785,978

SURFACE ACTIVE COMPOUNDS AND METHOD FOR THE PRODUCTION THEREOF

Willebrord Jean François de Rijck V. D. Gracht, Baasrode, Belgium, assignor to Lever Brothers Company, New York, N. Y., a corporation of Maine No Drawing. Application April 7, 1952, Serial No. 281,031

Claims priority, application Netherlands April 10, 1951

7 Claims. (Cl. 99—23)

This invention relates to novel surface active compounds and to a method for their production.

The novel compounds of this invention have utility in the preparation of emulsions and may be employed to prepare or stabilize such emulsions as margarine, baking plate greasers, ointments, hair dressings and face creams.

The novel compounds of this invention are also suitable for preparing water-in-oil emulsions containing as much as 80% water.

The novel compounds of this invention also have utility as additives for liquid chocolate and particularly chocolate used in the formation of chocolate coatings for ice cream briquettes which contain water. When coating ice cream briquettes with chocolate, pieces of ice cream flake off of the briquette and become mixed with the coating. The water from such flaked off pieces causes the finely ground sugar particles in the sugar coating to agglomerate, resulting in a thickening of the coating. This, in turn, makes the coating difficult to spread during the coating operation. With a coating containing the novel compounds of this invention, any water from pieces of ice cream entering the coating is emulsified in the fat of the coating as a result of the inherent action of the novel compounds in promoting the formation of water-in-oil emulsions. This prevents the water from contacting the sugar particles to any great extent so that any undue thickening of the coating due to water from ice cream flakes is prevented.

Generally speaking, the novel compounds are produced by reacting a polycondensed hydroxycarboxylic acid having at least 8 carbon atoms with a polycondensed polyhydric alcohol having at least 3 carbon atoms.

Preferably the hydroxycarboxylic acid has from 12 to 20 carbon atoms and an acid number not in excess of 70 and the polyhydric alcohol has from 3 to 6 carbon atoms.

The compounds obtained by polycondensation of hydroxycarboxylic acids are known as estolides. The term "polycondensation" as used herein means a reaction in which a number of molecules of the same compound combine to form larger molecules while water is eliminated. In order to obtain desired products, it is necessary that the hydroxycarboxylic acids be polycondensed before esterification with a polycondensed polyhydric alcohol to form a partial ester or partial ester-ether.

The hydroxycarboxylic acids which may be polycondensed may be any of the unsaturated or saturated acids having from 12 to 20 carbon atoms. Examples of such acids are ricinoleic acid, mono- or dihydroxy stearic acids or mixtures thereof such as castor oil fatty acids, dihydroxy acid obtained from palmitoleic acid, tetrahydroxy acid obtained from linoleic acid and the hexahydroxy acid obtained from linoleic acid or from eleostearic acid. Further, synthetic hydroxy acids such as those produced by the "Oxo" process may be used.

The hydroxycarboxylic acids may be polycondensed by heating under reduced pressure. An inert gas such as nitrogen or carbon dioxide may then be passed through the acid while heating is continued. Oxidizing gases should not be used. The temperature of polycondensation of the hydroxycarboxylic acids depends upon the nature of the fatty acids. Generally, the polycondensation may be performed at a temperature of from 200 to 230° C. for a period between about two and about 15 hours, depending upon the degree of condensation desired.

Polycondensation of the hydroxycarboxylic acid should be performed so as to provide an acid number preferably between 25 and 70 in the finished product. For example, ricinoleic acid, which gives good results when used in the process of this invention, may be heated in vacuo for about 5 hours at a temperature between about 205 and about 210° C. The resulting polyricinoleic acid has an acid number of 42. If the heating is continued for 10 hours, the acid number of the polyricinoleic acid drops to 35. Good emulsifying agents have been obtained using ricinoleic acid estolides obtained by polycondensing the estolides until their acid number was only 25.

The polyhydric alcohols which may be employed are those having from 3 to 6 carbon atoms. Suitable polycondensates of polyhydric alcohols containing at least 3 carbon atoms include polyglycerols, polyerythritols, polypentaerythritols and polymannitols. The polycondensation of the polyhydric alcohols may be continued until the final polycondensate has from about 6 to 18 carbon atoms. Good emulsions have been obtained using a polycondensate of polyglycerol having the mean composition of triglycerol ($n_D^{65} = 1.4800$). This polycondensate is prepared by heating glycerol in vacuo at a temperature between about 220 and 250° C. using as a catalyst about 0.25 to 0.50% NaOH in the form of a 4 N aqueous solution.

Generally speaking, the polycondensation of the polyhydric alcohols may be performed by heating the alcohol in vacuo at a temperature between about 220 and about 250° C. for 10 to 16 hours. Any well-known esterification catalyst may be used such as stannous chloride, zinc chloride, zinc oxide, aluminum chloride, and magnesium chloride.

Esterification is accomplished by heating the polycondensed hydroxycarboxylic acid and the polycondensed polyhydric alcohol together. The reaction time and temperature depend upon the nature of the reaction components. A temperature in the range of 180 to 230° C. has been found to give good results. The reaction proceeds below 180° C. but at such temperatures tends to be slow. The esterification reaction is continued until the reaction product has a low acid number which, generally speaking, means below 10 and preferably below 1.5. It may be desirable in some instances to conduct the reaction in vacuo. An inert gas may also be passed through the reaction mixture.

Any catalyst normally employed in esterification processes for esterifying fatty acids with alcohols may be employed such as those previously mentioned for use in the polycondensation of the polyhydric alcohols.

The partial esters or ester-ethers prepared by the process of the invention have proved to be good emulsifying and stabilizing agents in water-in-oil emulsions. The emulsifying properties of these compounds can be enhanced by the addition of a small quantity of alkali hydroxide, such as sodium hydroxide in the form of a 1 N aqueous solution.

The invention will be further illustrated by reference to the following specific examples:

EXAMPLE 1

*Preparation of a partial polyglycerol ester of polyricinoleic acid*

A mixture of fatty acids having an acid number of 170, prepared by saponifying castor oil, was heated at a temperature between 200 and 210° C. in vacuo for 16 hours while nitrogen gas was passed through the mixture. At the end of this period the acid number had dropped to 35. 100 parts by weight of the resulting estolides were then esterified with 10 parts by weight of polyglycerol ($n_D^{65}=1.4808$) by heating the mixture in vacuo for five hours at 210° C. while nitrogen gas was passed through the reaction mixture. The partial ester product had an acid number of 1.2 and an index of refraction ($n_D^{65}=1.4648$).

EXAMPLE 2

To illustrate the utility of the product of Example 1 an emulsion was prepared by mixing 72 parts by weight of sunflowerseed oil with 8 parts by weight of the product of Example 1. After heating to 60° C., 320 parts by weight of hot water were emulsified in the mixture. A fluid water-in-oil emulsion was obtained.

The emulsion was very stable and did not break when compressed.

For comparison, an emulsion was prepared with an emulsifying agent obtained by esterifying noncondensed ricinoleic acid with 10% by weight of polyglycerol ($n_D^{65}=1.4812$) at 210° C. The emulsion was poor and separated completely into its competent parts.

A satisfactory emulsion was also prepared by mixing 38 parts by weight of sunflowerseed oil, 60 parts by weight of water and 2 parts by weight of the product prepared in accordance with Example 1.

EXAMPLE 3

*Preparation of partial esters of polyglycerol and polycondensed monohydroxy stearic acid*

Monohydroxy stearic acid, obtained by splitting hydrogenated castor oil and having an acid number of 185, was heated in vacuo at 140° C. for 14½ hours while carbon dioxide gas was passed through the reaction mixture, at the end of which time, the acid number was 36.3. 100 parts by weight of the resulting estolide was esterified with 10 parts by weight of polyglycerol ($n_D^{65}=1.4812$) by heating for 6½ hours at 210° C. while carbon dioxide gas was passed through the reaction mixture. The resulting product had an acid number of 2.

EXAMPLE 4

*Preparation of partial esters of polyglycerol and polycondensed dihydroxy stearic acid*

Dihydroxystearic acid, prepared by the alkaline permanganate oxidation of crude tea-seed oil as described in Journal für praktische Chemie 33, p. 304 (1886), and having an acid number of 185, was polycondensed in vacuo at 200° C. After heating for 2 hours while carbon dioxide gas was passed through the reaction mixture, the acid number dropped to 31.3. The estolide product was then heated in vacuo to 180° C. with 10% by weight of polyglycerol ($n_D^{65}=1.4812$) for 20 minutes while carbon dioxide gas was passed through the reaction mixture. A thick fluid product having an acid number of 2 was obtained.

EXAMPLE 5

To illustrate the reduction in viscosity of chocolate coatings resulting from the addition thereto of the partial ester prepared in accordance with Example 1, standard coating mixes for ice cream briquettes were prepared having 45% fat including cocoa butter, 40% sugar, and 15% cocoa solids. Viscosity measurements were made at 38° C. on samples of this coating containing (a) no emulsifier, (b) 0.3% lecithin, (c) 0.3% of the partial ester of Example 1, and (d) 0.15% of the partial ester of Example 1. An average of 4 samples was made in each case and the percentage lowering of viscosity calculated in the cases (b), (c) and (d). The results obtained were, (b) 0.3% lecithin, lowering of viscosity=23%, (c) 0.3% of the partial ester of Example 1, lowering of viscosity= 43%, (d) 0.15% of the partial ester of Example 1, lowering of viscosity=22%.

Thus, it is apparent that the partial ester of Example 1 is about twice as effective as lecithin in lowering the viscosity of chocolate coatings for use with ice cream briquettes.

EXAMPLE 6

To illustrate the enhanced effect of the partial esters as produced in accordance with Example 1 in preventing the thickening of chocolate coatings for ice cream briquettes due to pieces of ice cream becoming mixed with the coating, coatings containing (a) 0.3% lecithin, (b) 0.3% of the partial ester of Example 1, and (c) 0.15% of the partial ester of Example 1 were used to coat ice cream briquettes. Samples of each coating were taken at the beginning and end of a day's production of briquettes and the viscosity of these samples was measured. The results obtained were, (a) 0.3% lecithin, variation in viscosity during coating operation=+26%, (b) 0.3% of the partial ester of Example 1, variation of viscosity during coating operation=−5.5%, and (c) 0.15% of the partial ester of Example 1, the variation in viscosity during coating operation=+11%.

Thus, it is apparent that the partial ester of Example 1 is considerably more effective than lecithin in preventing thickening of chocolate coatings used for coating ice cream briquettes.

It will be obvious to those skilled in the art that many modifications may be made within the scope of the present invention without departing from the spirit thereof, and the present invention is to be restricted only in accordance with the appended claims.

I claim:

1. A method for the production of surface active agents which comprises reacting an estolide of a substantially unpolymerized aliphatic hydroxycarboxylic acid, having 12 to 20 carbon atoms and an acid number not in excess of 70, with a polycondensed polyhydric alcohol having 3 to 6 carbon atoms at a temperature in the range of about 180° C. to about 210° C. until the acid number drops to below 10.

2. A method for the production of surface active agents which comprises reacting an estolide of a substantially unpolymerized aliphatic hydroxycarboxylic acid, having 12 to 20 carbon atoms and an acid number not in excess of 70, with a polycondensed polyhydric alcohol having 3 to 6 carbon atoms at esterification conditions until the acid number drops to below 10.

3. The surface active agents produced by the process of claim 1.

4. A stabilized water-in-oil emulsion comprising a mixture of water, oil, and a minor quantity of a compound prepared by reacting an estolide of a substantially unpolymerized aliphatic hydroxycarboxylic acid, having 12 to 20 carbon atoms and an acid number not in excess of 70, with a polycondensed polyhydric alcohol having 3 to 6 carbon atoms at a temperature in the range of about 180° C. to about 210° C. until the acid number drops to below 10.

5. A fluid sugar-containing coating adapted for use on food products containing frozen water comprising a mixture of fat, sugar, and a minor quantity of a compound prepared by reacting an estolide of a substantially unpolymerized aliphatic hydroxycarboxylic acid, having 12 to 20 carbon atoms and an acid number not in excess of 70, with a polycondensed polyhydric alcohol having 3 to 6 carbon atoms at a temperature in the range of about 180° C. to about 210° C. until the acid number drops to below 10.

6. A fluid chocolate coating for food products containing frozen water comprising a mixture of cocoa butter, sugar, cocoa solids, and a minor quantity of a compound prepared by reacting an estolide of a substantially unpolymerized aliphatic hydroxycarboxylic acid, having 12 to 20 carbon atoms and an acid number not in excess of 70, with a polycondensed polyhydric alcohol having 3 to 6 carbon atoms at a temperature in the range of about 180° C. to about 210° C. until the acid number drops to below 10.

7. A method for the production of surface active agents which comprises reacting an estolide of a substantially unpolymerized aliphatic hydroxycarboxylic acid having at least 8 carbon atoms with a polycondensed polyhydric alcohol having at least 3 carbon atoms until the acid number drops to below 10.

References Cited in the file of this patent
UNITED STATES PATENTS

| | | |
|---|---|---|
| 2,156,737 | Priester | May 2, 1939 |
| 2,221,674 | Ellis | Nov. 12, 1940 |
| 2,441,555 | Barth et al. | May 18, 1948 |
| 2,590,046 | Schoenfeld | Mar. 18, 1952 |